(12) United States Patent
Imperial

(10) Patent No.: US 9,812,896 B2
(45) Date of Patent: Nov. 7, 2017

(54) PORTABLE SOLAR POWER STATION

(71) Applicant: NextArts, San Francisco, CA (US)

(72) Inventor: Anthony Imperial, San Francisco, CA (US)

(73) Assignee: NextArts, San Francisco, CA (US)

( * ) Notice: Subject to any disclaimer, the term of this patent is extended or adjusted under 35 U.S.C. 154(b) by 266 days.

(21) Appl. No.: 14/825,040

(22) Filed: Aug. 12, 2015

(65) Prior Publication Data

US 2017/0047770 A1    Feb. 16, 2017

(51) Int. Cl.
| | |
|---|---|
| *H02J 7/00* | (2006.01) |
| *H02J 7/35* | (2006.01) |
| *H02S 20/30* | (2014.01) |
| *H02S 40/32* | (2014.01) |
| *H02S 40/38* | (2014.01) |
| *H02S 40/42* | (2014.01) |
| *H04R 1/02* | (2006.01) |

(52) U.S. Cl.
CPC .............. *H02J 7/35* (2013.01); *H02J 7/0024* (2013.01); *H02S 20/30* (2014.12); *H02S 40/32* (2014.12); *H02S 40/38* (2014.12); *H02S 40/42* (2014.12); *H04R 1/028* (2013.01); *H02J 7/0021* (2013.01)

(58) Field of Classification Search
None
See application file for complete search history.

(56) References Cited

U.S. PATENT DOCUMENTS

| | | | |
|---|---|---|---|
| 5,969,501 A | 10/1999 | Glidden et al. | |
| 6,201,181 B1 | 3/2001 | Azzam et al. | |
| 7,469,541 B1 * | 12/2008 | Melton ................... | H02S 20/32 60/641.1 |
| 7,492,120 B2 | 2/2009 | Benn et al. | |
| 8,212,142 B2 | 7/2012 | Lyman et al. | |
| 2007/0013340 A1 * | 1/2007 | Mattichak ............. | H02J 7/0029 320/101 |
| 2014/0190551 A1 | 7/2014 | French, Sr. | |

* cited by examiner

*Primary Examiner* — Jared Fureman
*Assistant Examiner* — Aqeel Bukhari
(74) *Attorney, Agent, or Firm* — Perkins Coie LLP

(57) ABSTRACT

A portable solar power station is disclosed herein. The power station is contained and configured with sufficient power to support a plurality of industrial devices and appliances. The devices and appliances can be utilized for a variety of professional and recreational activities. The power station is easily transported because it can fit, e.g., into a truck's bed or a van's cargo area and is not so heavy, e.g., that a person of mild to average strength would have difficulty pushing, lifting or otherwise moving the power station.

15 Claims, 6 Drawing Sheets

PORTABLE SOLAR POWER STATION

TECHNICAL FIELD

The technology generally relates to providing a power source to electronic appliances. The technology more particularly relates to a portable solar power source.

BACKGROUND

Industrial devices use electrical power to function, but may be situated a distance away from a convenient power source. A mobile DJ or audio-visual presenter, for example, may employ the use of industrial equipment for audio-visual purposes, but may often find themselves too remote for convenient access to a power source. Needs for a power source may similarly arise at other remote locations such as major special events, concerts, or constructions sites.

AC power generators are conventionally used to deliver power to remotely located devices. Though useful to deliver temporary power, power generators can be very noisy. Noise produced by power generators is primarily comprised of engine noise and exhaust noise, and can easily exceed 100 decibels. The exhaust poses an additional problem, namely that usage in confined areas may pose a health hazard to persons, animals or other living organisms by virtue of the fumes or other gases emitted.

SUMMARY

Disclosed herein are embodiments of solar power station device which is mobile, contained, and provides sufficient power for a plurality of activities and including special events and gatherings. According to some embodiments, the solar power station device is of a form factor which enables portability in a truck bed or van cargo room. Further, the solar power station, in such embodiments, may be pushed easily by a person possessing mild to average strength.

In some embodiments, the solar power station device is equipped with a solar panel and a rechargeable battery pack. The DC current provided by the panel and battery pack is converted to AC by an inverter, and an inductor converts the inverter's square wave output into sine waves. A plurality of electric outlets receive the sine waves and transmit the power to attached industrial devices and/or appliances.

In some embodiments, a portable entertainment system is equipped with a portable AC power source (such as a solar power station) and comprises speakers, possibly also a display, and a media storage and playback unit, all of which are powered by the AC power source. The power source, speakers, display and storage and playback unit are portable and can be transported easily by a person possessing mild to average strength.

DETAILED DESCRIPTION OF THE PREFERRED EMBODIMENTS

Figure 1:
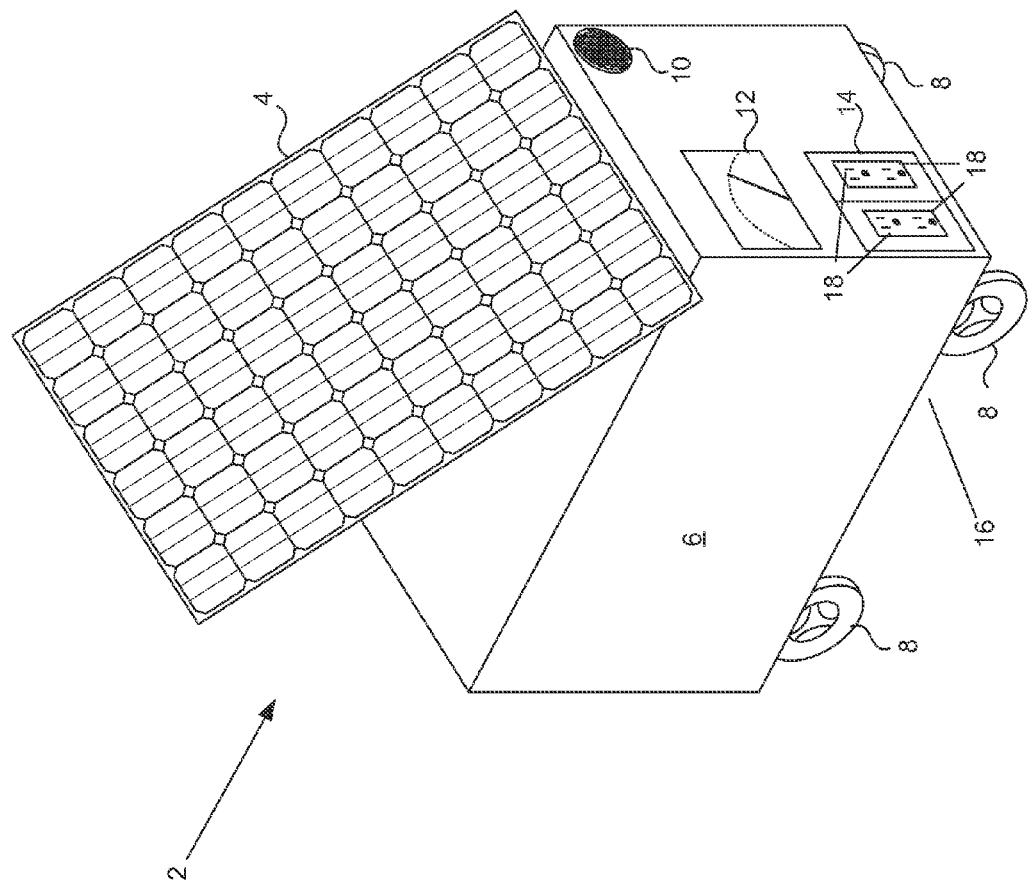
FIG. 1 is an isometric view of a mobile power station, according to various embodiments.

FIG. 1 is an isometric view of a mobile power station 2, according to various embodiments. The mobile solar power station 2 comprises a solar panel 4, including a plurality of photovoltaic cells, mounted atop a container 6.

In accordance with various embodiments, the technology is directed to utilizing solar panels for generating energy for the mobile power station 2. Among other benefits, such use of the solar panels for the mobile power station 2 to produce electrical energy advantageously provides a system that emits appreciably less noise than AC power generators. Solar panels convert the energy of sunlight into electrical energy which can be used by industrial devices. By relying on the energy in sunlight, solar power systems do not require the transportation and maintenance of additional fuel (e.g. gasoline) in order to function. This property renders solar power systems comparatively more convenient to transport and operate than AC power generators. In some embodiments, photovoltaic solar panels may be used in implementing the technology. Examples of solar panels 4 include: Sharp ND-250QCS, Kyocera KD325GX-LPB, LG 275S1C-B3 and other suitable panels known in the art.

In some embodiments, the external features of a container 6 are comprised of the following: a set of wheels 8, an intake vent 10 through which external air is drawn in, a battery charge indicator 12 affixed to the outside of the container, an outlet bank 14 affixed to the outside of the container and an outtake vent 16 through which internal air is be sent out of the container 6.

The battery charge indicator 12 may be attached to the exterior of the container 6 and display various quantitative information pertaining to the current charge status of the power station 2 or to prior electrical energy use, including but not limited to: percent of battery power used, percent of battery power remaining and amp hour usage.

The outlet bank 14 contains a plurality of AC current outlets 18 including stagepin connector(s), standard AC connector(s) and L5-20 connector(s) or any combination of AC current connector(s) compatible with electric-powered industrial devices.

In some embodiments, the size and weight of a power station 2 can be constrained to provide convenient appliance access to power. For example, a mobile DJ or audio-visual presenter may employ the use of industrial equipment and appliances for audio-visual purposes in an area inaccessible to motor vehicles, such as on a rooftop or in a park. In such an example, the presenter may require a power source which is both small and capable of being transported by a person of average strength. To meet the demands of these situations, the physical height profile of the mobile solar power station 2, in some embodiments, may be limited to under five feet tall. The container 6 is configured for human powered transport so it can be pushed, pulled and/or carried to the location of its use. These features increase the ease with which the power station 2 may be transported by a person of average strength to areas in which access to power is not otherwise supported.

Figure 2:
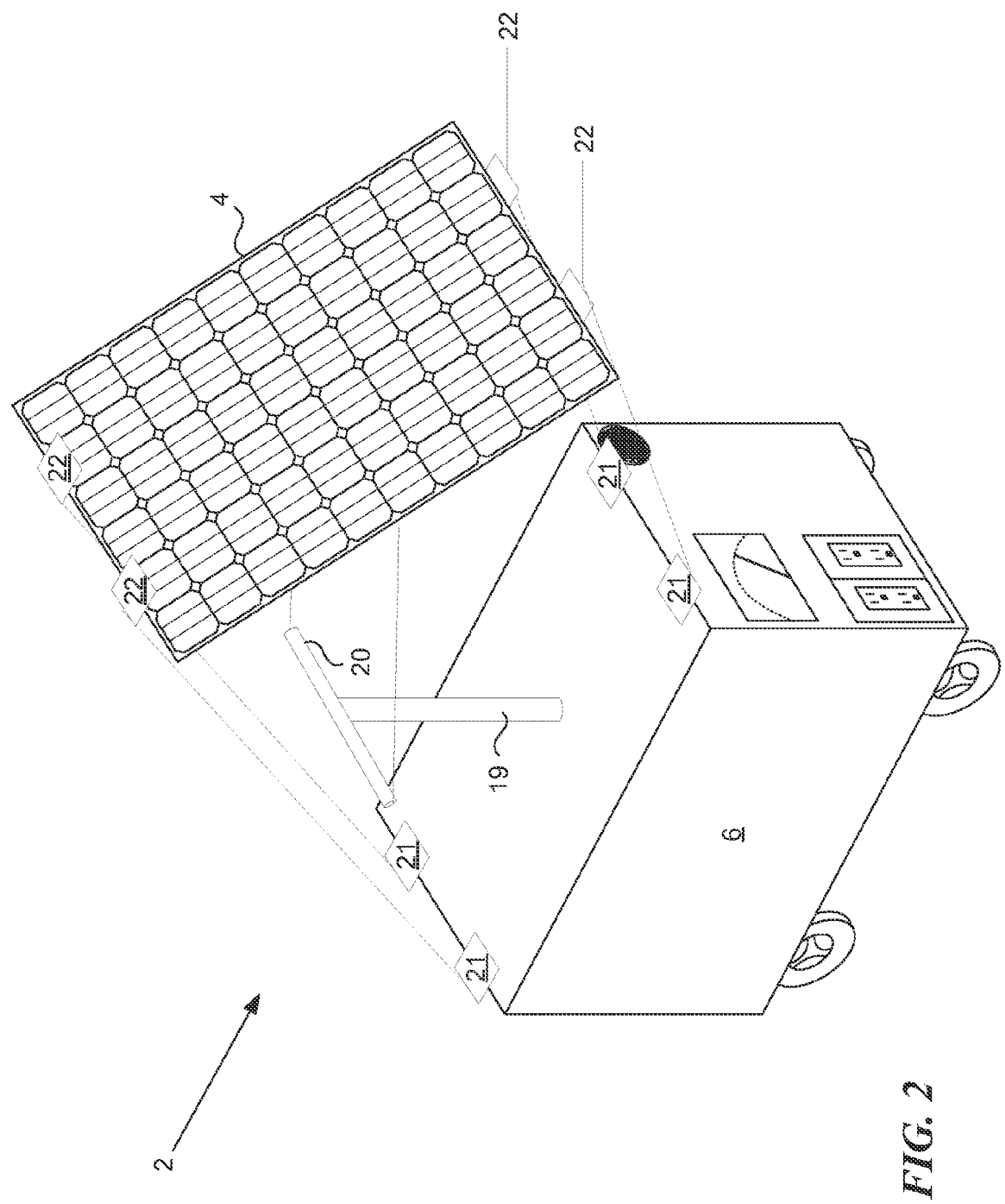
FIG. 2 is an isometric view of a mobile power station with a solar panel mounted on an articulating mast, according to various embodiments.

FIG. 2 is an isometric view of a mobile power station 2 with a solar panel 4 mounted on an articulating mast 19, according to various embodiments. In this detached view, the mast 19 upon which the solar panel rests is visible. The mast 19 is mounted on top of the container 6. In some embodiments, the mast 19 is configured for quick-release detachment from the container 6. The solar panel 4 mounts atop the mast 19 to an articulable joint 20. When mounted, the solar panel 4 is enabled to pivot about the joint 20. In some embodiments, the solar panel 4 is configured for a quick release detach from the panel's 4 position atop the articulable joint 20.

The solar panel 4 is enabled to pivot down toward the container 6 and lock into a position through the use of articulation locks 21. In some embodiments, there are four articulation locks 21 placed along the top face of the container 6: two locks 21 along the front edge and two locks 21 along the back edge. The solar panel 4 has four latching points 22, two along the front edge and two along the back edge, which can be locked into the articulation locks 21 when the latching points 22 are brought into contact with the locks 21.

Figure 3:
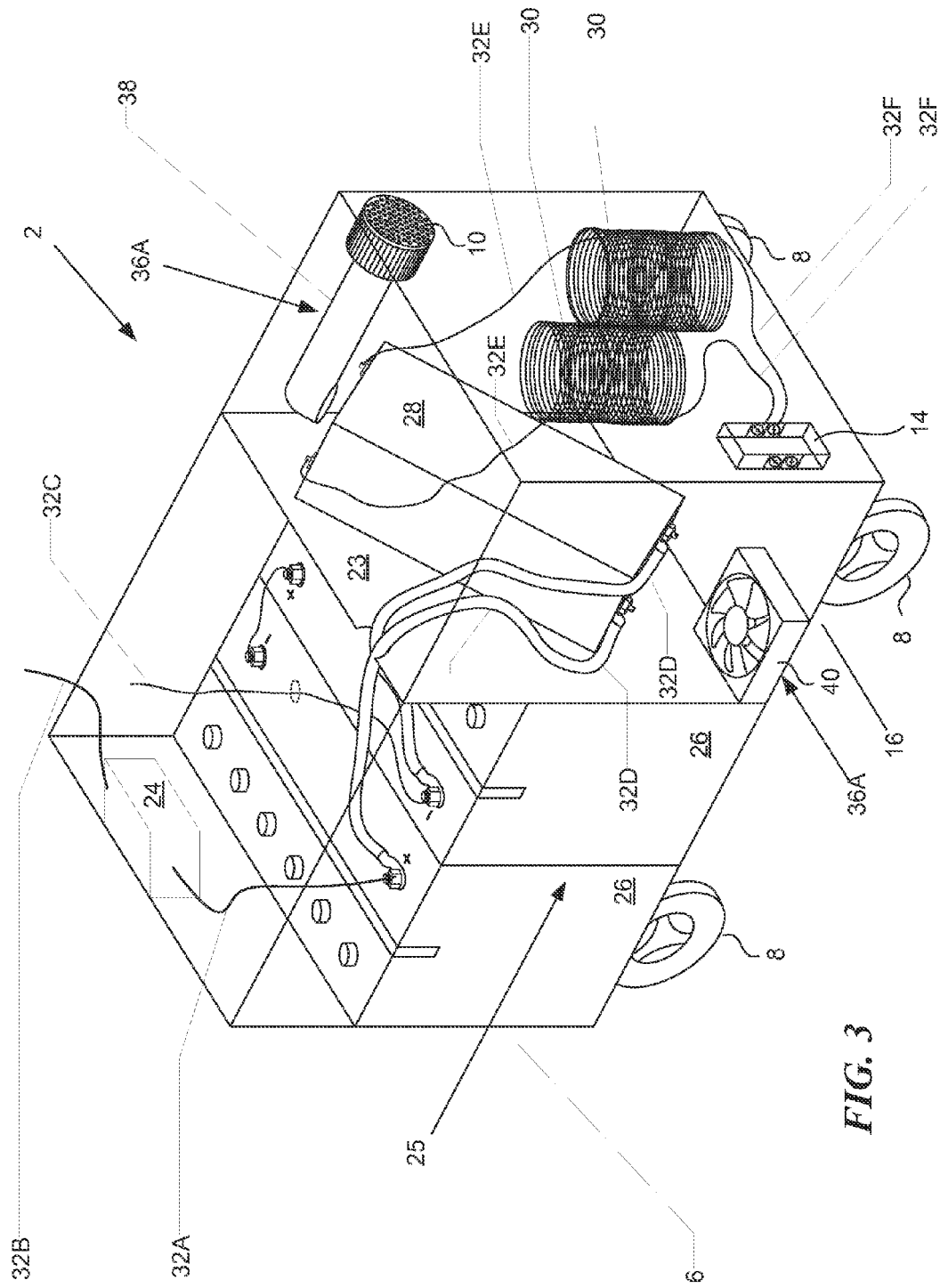
FIG. 3 is a transparent view of the internal components of a mobile power station, according to various embodiments.

FIG. 3 is a transparent view of the internal components of a mobile power station 2, according to various embodiments. In this embodiment, the container 6 has an internal support structure 23 is configured to secure a voltage regulator 24, rechargeable battery pack 25, a power inverter 28, inductor coils 30 and the internal portion of the outlet bank 14 observed in FIGS. 1 and 2. A plurality of insulated wires 32 connect the electrical components of the power station 2. The support structure 23 also secures components of the cooling system 36. Embodiments which use an air-based cooling system 36A can include a cooling vent 38 and a fan 40.

The container's 6 interior support structure 23, configured to secure the power station's 2 internal components, may be substantially comprised of wood, plastic, metal, carbon-fiber material, or other suitable materials known in the art. Lighter materials increase the ease with which the power station 2 may be transported by a person of average strength to areas in which access to power is not otherwise easily accessible.

In some embodiments, the power station 2 can contain a voltage regulator 24. The regulator 24 can allow a user to control the power output by the solar panel 4 and used by other components of the power station 2. In some embodiments, the regulator 24 is mounted to the internal support structure 23 of the container 6. In other embodiments, the regulator is mounted to the solar panel 4. Some solar panels 4 are configured with a voltage regulator 24 as a component of the panel 4. The voltage regulator 24 is connected to the rechargeable battery pack 25 using an insulated wire 32A and connected to the solar panel using an insulated wire 36B. Since the panel 4 will be connected to the battery pack 25 via an insulated wire 32C, this means that the voltage regulator 24 and solar panel 4 are wired in series.

Some embodiments include a rechargeable battery pack 25 that includes one or more rechargeable batteries 26. The rechargeable batteries 26 store the electrical output received from the solar panel 4. In some embodiments, non-flooded batteries can be utilized to prevent issues inherent with flooded batteries. For example, flooded batteries can leak acid if the flooded batteries are not maintained in an upright position. Non-flooded batteries advantageously neutralize the risk of the batteries 26 being stored in a non-vertical manner. Examples of non-flooded batteries 26 include AGM, lithium-ion, lithium-air or other suitable rechargeable non-flooded batteries. In some embodiments, the combined voltage of the batteries 26 in the battery pack 25 is at least 24 VDC. In some embodiments the combined current of the batteries 26 in the battery pack 25 is configured to be at least 10 amps.

In order to provide devices with alternating current, a power inverter 28 can be used to convert the direct current supplied by the solar panel 4 into alternating current. The power inverter 28 is configured to be connected to the rechargeable battery pack 25 at the inverter's input terminals via insulated wires 32D.

The power inverter 28 and the battery pack 25 are wired in parallel with the solar-panel/voltage regulator system.

Included in FIG. 3 are two inductor coils 30, each of which is attached to an output terminal of the power inverter 28 via insulated wires 32E. The inductor coils 30 are configured to convert the power inverter's square wave output into sine waves. The inductor coils 30 can be rated at 3 mH of inductance and can be air-cored or feature other cores which are known in the art. The square wave-sine wave conversion results in a variable current that may increase the efficacy of the power station 2 in providing significant electrical power to a plurality of industrial devices over a significant period of time. The insulated wires 32F transmit the converted sinusoidal waves to the outlet bank 14. In particular, the converted sinusoidal waves can be received by the outlets 18 in the outlet bank 14. The outlets 18 can be configured to enable industrial devices, once plugged in, to draw power from the power station's 2 rechargeable battery pack 25, from the solar panel 4, or from both simultaneously.

In an enclosed system containing electrical components such as is the case within the container 6, a cooling system 36 may be important to promote safe and effective use. In FIG. 3, the cooling system is primarily designed to cool the power inverter 28. Any method of cooling which relies on electric power may be powered by the solar power 4 directly or it may receive power from the rechargeable battery pack 25, or from both simultaneously.

An air-based cooling system 36A is depicted in FIG. 3 including an intake pipe 38 and a fan 40. The intake pipe 38 is connected to the air exterior because the pipe 38 connects to an intake vent 10. The power inverter 28 is configured to allow air to pass through. Exterior air taken in through the pipe 38 can be drawn by the fan 40 through the inverter 28. This air is then sent outside the container 6 through an outtake vent 16 adjacent to the fan 40.

Figure 4:
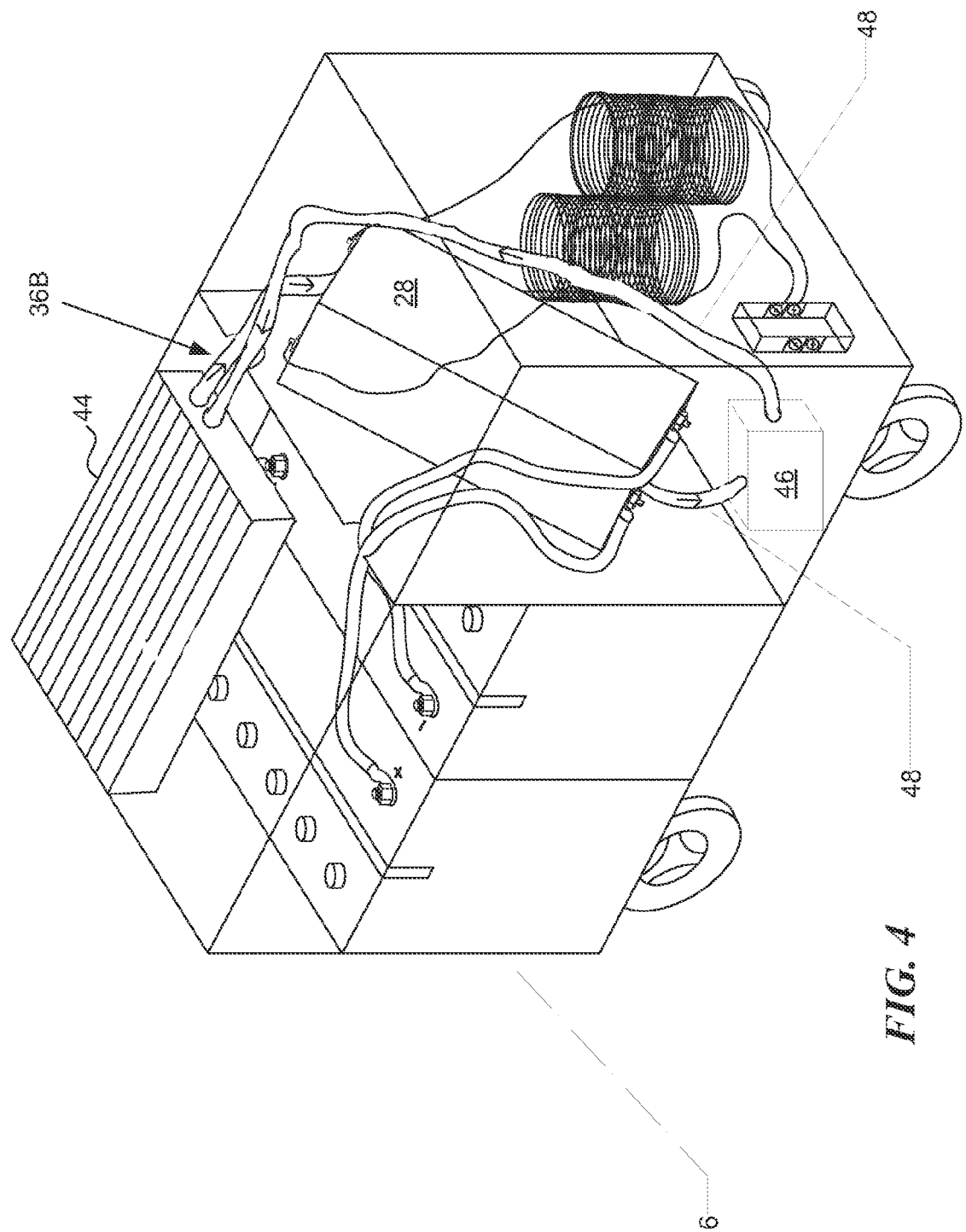
FIG. 4 is a transparent view of the internal components of a mobile power station with liquid cooling, according to various embodiments.

FIG. 4 presents an embodiment of the invention which employs a liquid cooling system 36B to cool the inverter 28. Water is stored and cooled in a cooling apparatus 44 which is secured to the container 6. The cooled water is pumped by a pump apparatus 46 through a hose 48 which runs directly through and cools the inverter 28. The water is warmed in the process of passing through the inverter 28. The warmed water passes through the pump apparatus 46 and is pumped back into the cooling apparatus 44 through a hose 48.

Figure 5:
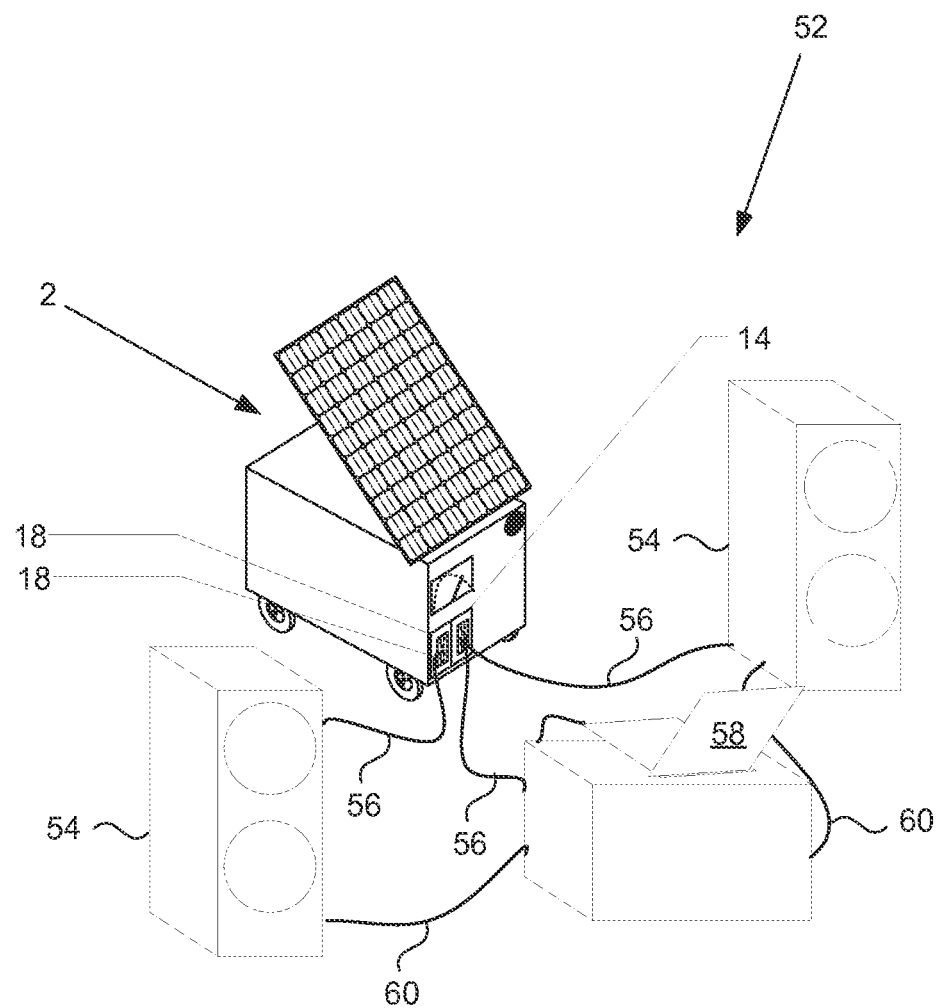
FIG. 5 is an isometric view of a self-contained mobile entertainment apparatus, according to various embodiments.

FIG. 5 is an isometric view of a self-contained mobile entertainment apparatus 52, according to various embodiments. In some embodiments, the apparatus 52 is comprised of a mobile solar power station 2, speakers 54 and an audio file storage and playback apparatus 58.

The mobile solar entertainment system 52 can be used to provide audio entertainment in locations that lack convenient access to electrical power. For example, a DJ can use the system to conduct her business in a park, on a roof or in a large conference center where access to electricity may otherwise prove logistically difficult.

The speakers 54 emit sound waves based on an output signal communicated to the speakers by the audio file storage and playback apparatus 58 and transmitted via audio cables 60. The speakers are powered by the solar power station 2, connected via a power cable 56 that is plugged into an electrical outlet 18 in the power station's 2 outlet bank 14. The transportability of the speakers may be improved if they are mounted atop wheels so that they may be pushed or pulled in the same manner as the solar power station 2. In some embodiments the speakers 54 and the solar power system 2 may be of similar size and/or have a substantially similar physical height profile. Not only can this serve as an aesthetic feature but may also functionally improve the transportability of the entertainment system 52.

The audio file storage and playback apparatus 58 may be a portable computer, CD/DVD player, cell phone or any other device capable of outputting audio signals to speakers 54. This apparatus is powered by the solar power station 2, connected via a power cable 56 that is plugged into an electrical outlet 18 in the solar power station's 2 outlet bank 14.

Figure 6:
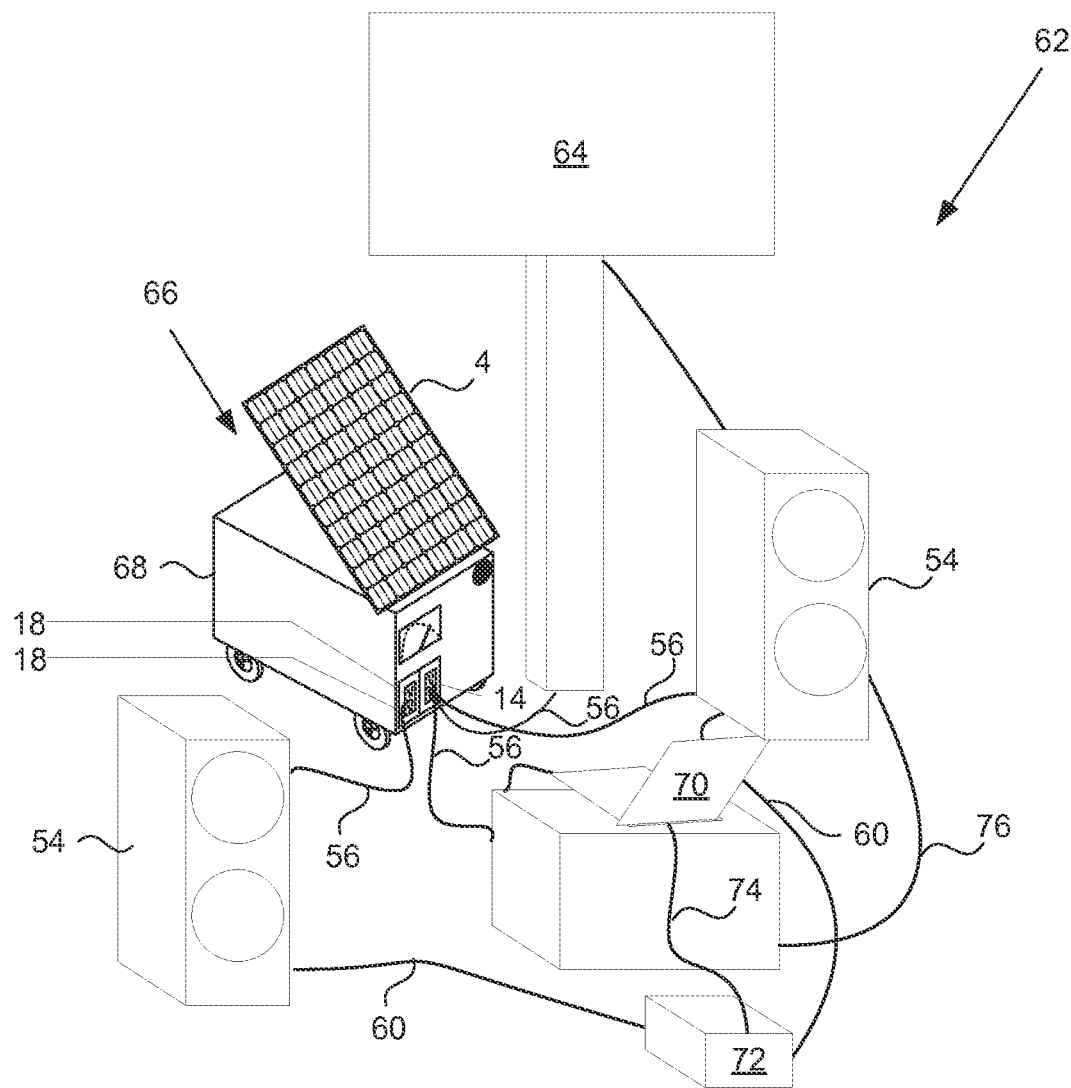
FIG. 6 is an isometric view of a self-contained mobile entertainment apparatus including a display screen, according to various embodiments.

FIG. 6 is an isometric view of a self-contained mobile entertainment apparatus 62 including a display screen 64, according to various embodiments. A power generator 66, comprising a solar panel 4 and an AC power unit 68, powers speakers 54, a display screen 64 and a media playback and storage apparatus 70 via power cables 56 plugged into an outlet 14 in the power unit's 68 electrical outlet bank 18.

In some embodiments, the power generator 66 is enabled to store DC power collected by a solar panel 4 and convert DC power (stored or directly from the solar panel 4) into an AC output for use by industrial devices and appliances. Varying embodiments resemble a portable power station 2.

The media playback and storage apparatus 70 transmits a media signal to an amplifier 72 via a cable capable of transmitting audio media 74. Embodiments utilize a 500 watt amplifier 72 which is powered by the power generator 66. Speakers 54 receive the media signal from the amplifier 72 via cables capable of transmitting audio media 60. In some embodiments, the media playback and storage apparatus 70 transfers a media signal to a display 64 via a cable capable of transmitting video and/or audio media 76. Embodiments comprise LCD TVs, digital projectors and other display technologies known in the art. The display 64 may be used to supplement audio entertainment with video. For example, a DJ can use the display 64 to provide a music video or to project music lyrics for her customers to sing along with.

While the components of the entertainment apparatus 62 are designed to be individually portable by a human, certain embodiments include design features which render the apparatus 62 increasingly mobile. In some embodiments, the generator 66 and the speakers 54 are equipped with wheels. In some embodiments the speakers 54 and the power generator 66 may be of similar size and/or have a substantially similar physical height profile.

Average pushing force for a person's arms at the most efficient angle is between 400 and 600 Newtons. Converted into pounds-force, this amount is 90 to 135 pounds. This does not include additional force provided by a person's legs. The first standard deviation ranges roughly 225 Newtons, or roughly 50 pounds force.

Moving an object, especially an object with wheels, involves a sensible direction of applied force. When discussing the maximum required force to move the object, this refers to the force required to overcome the object's inertia in a direction where the wheels are utilized effectively. Further, the discussion for maximum force required takes into account a substantially flat surface to move the object across.

Substantially flat surfaces include, but are not limited to, paved ground, interior flooring materials, dried concrete, substantially even grassy surfaces, and substantially even dirt roads.

Once an object's inertia is overcome, moving an object over a flat surface uses less force to maintain a constant speed. Accordingly, in many circumstances, a person applies constant force to move an object, though less than the initial force required to move the object.

The invention claimed is:

1. A mobile solar power station apparatus, comprising:
   a container, the container including an enclosed internal support structure configured to secure components and external wheels;
   a solar panel mounted on an articulable joint atop a mast, the mast mounted on top of the container;
   a rechargeable battery pack comprised of non-flooded batteries with combined voltage of at least 24 VDC, said rechargeable battery pack mounted securely to the internal support structure of the container, said rechargeable battery pack receiving output from the solar panel;
   a voltage regulator mounted to the internal support structure of the container, and configured to regulate an output of the solar panel;
   a power inverter mounted to the internal support structure of the container, the power inverter having input terminals and output terminals and an inductor coil electrically coupled to each of the output terminals of the power inverter, wherein the input terminals are electrically coupled to the rechargeable battery pack;
   an outlet bank mounted on an outer wall of the container, the outlet bank configured to receive the output of the power inverter;
   a cooling system associated with the power inverter, and further configured to receive power from either of the solar panel or the rechargeable battery pack; and
   wherein the solar panel and the voltage regulator are electrically coupled in series and in turn in parallel with the rechargeable battery pack, and further in parallel with the power inverter, the mobile solar power station apparatus configured to require no more than 170 pounds-force to transport across a substantially flat surface.

2. The mobile power station of claim 1, further comprising:
   a battery charge indicator mounted on the exterior of the container and configured to display the current charge status of the rechargeable battery pack.

3. The mobile power station of claim 1, wherein the cooling system further comprises:
   a fan, the fan configured to receive power from either of the solar panel or the rechargeable battery pack; and
   an intake pipe, the intake pipe connecting air exterior to the container to the power inverter, and the fan configured to draw the air exterior to the container through the power inverter.

4. The mobile power station of claim 1, wherein the rechargeable battery pack comprises one or more AGM batteries.

5. The mobile power station of claim 1, wherein the rechargeable battery pack comprises of one or more lithium-ion batteries.

6. The mobile power station of claim 1, wherein the rechargeable battery pack comprises of one or more lithium-air batteries.

7. The mobile power station of claim 1, further comprising:
   an articulation lock on the exterior of the container, the articulation lock configured to lock articulation of the solar panel to a single position.

8. The mobile power station of claim 1, wherein the outlet bank includes at least one of: a stagepin connector, a standard AC connector, or an L5-20 connector.

9. The mobile power station of claim 1, wherein the internal support structure comprises carbon-fiber material.

10. The mobile power station of claim 1, wherein the solar panel is configured for quick release disassembly from the mast, and wherein the mast is configured for quick release disassembly from the container.

11. The mobile power station of claim 1, wherein the physical height profile of the mobile power station is configured to be under five feet tall.

12. The mobile power station of claim 1, configured to require no more than 600 Newtons of force to transport across a substantially flat surface.

13. A mobile solar entertainment system, comprising:
   a solar power station, including:
      a container, the container including an enclosed internal support structure configured to secure components and external wheels;
      a solar panel mounted on an articulable joint atop a mast, the mast mounted on top of the container;
      a rechargeable battery pack comprised of non-flooded batteries with combined voltage of at least 24 VDC, said rechargeable battery pack mounted securely to the internal support structure of the container, said rechargeable battery pack receiving output from the solar panel;
      a voltage regulator mounted to the internal support structure of the container, and configured to regulate an output of the solar panel;
      a power inverter mounted to the internal support structure of the container, the power inverter having input terminals and output terminals and an inductor coil electrically coupled to each of the output terminals of the power inverter, wherein the input terminals are electrically coupled to the rechargeable battery pack;
      an outlet bank mounted on an outer wall of the container, the outlet bank configured to receive the output of the power inverter;
      a cooling system associated with the power inverter, and further configured to receive power from either of the solar panel or the rechargeable battery pack; and
      wherein the solar panel and the voltage regulator are together wired in parallel with the rechargeable battery pack, and also wired in parallel with the power inverter, the solar power station configured to require no more than 170 pounds-force to transport across a substantially flat surface;
   speakers external to the container, the speakers electrically coupled to the outlet bank of the solar power station; and
   audio file storage and playback apparatus coupled to the speakers, the audio file storage and playback apparatus electrically coupled to the outlet bank, the audio file storage and playback apparatus configured to communicate an audio signal to the speakers.

14. A mobile solar entertainment system of claim 13, wherein the speakers further comprise exterior wheels.

15. A mobile solar entertainment system of claim 13, wherein the speakers and the solar power station have a substantially similar physical height profile.

* * * * *